UNITED STATES PATENT OFFICE.

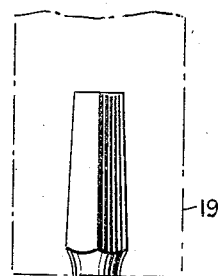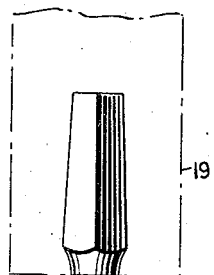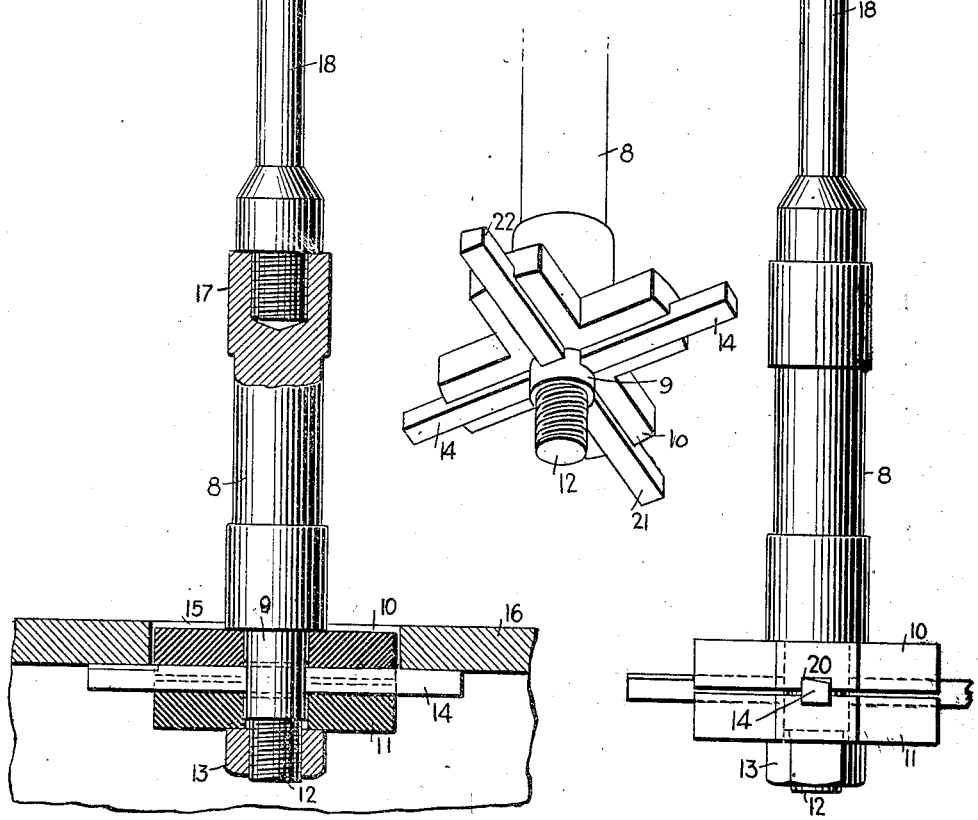

SIGURD DIESETH, OF CARTERET, NEW JERSEY, ASSIGNOR OF ONE-HALF TO JOHN GERIG, OF CARTERET, NEW JERSEY.

DRESSER FOR BOILER-CAP SEATS.

1,085,025.  Specification of Letters Patent.  Patented Jan. 20, 1914.

Application filed February 17, 1913. Serial No. 748,860.

*To all whom it may concern:*

Be it known that I, SIGURD DIESETH, a subject of the King of Norway, and a resident of Carteret, in the county of Middlesex and State of New Jersey, have invented a new and Improved Dresser for Boiler-Cap Seats, of which the following is a full, clear, and exact description.

Among the principal objects which the present invention has in view are: To provide in a tool of the character mentioned means for the ready interchange of cutting and scraping members; and to provide in a tool of the character mentioned a head adapted for alternate combination with a power-driven mechanism or a hand tool.

One embodiment of the present invention is shown in the accompanying drawings, in which—

Figure 1 is a sectional elevation of a tool of the character named, constructed and arranged in accordance with the present invention and shown in conjunction with a hand-brace; Fig. 2 is a side view of the same, looking toward the end of a cutter bar held therein; Fig. 3 is a detail view, in perspective, showing the stationary member of the clamping plate of the tool, and the cutter bar as disposed therein.

As seen in the accompanying drawings, the tool provides a body portion 8. At one end, the body portion is reduced to form a pintle 9, over which may be threaded the clamping plates 10 and 11. The end of the pintle 9 is reduced and threaded to form a screw end 12, upon which is threaded a nut 13 when the parts are disposed in service relation.

The plate 10 is preferably constructed, as shown in Fig. 3 of the drawings, to provide lateral extensions the ends whereof are curved concentrically with the axis of the pintle 9. The ends of the extensions of the plate 10 serve as guides for the cutter bars 14, 21 and 22. By constructing the plate 10 in the manner shown, provision is made for the insertion of said plate, when provided with the said cutter bars through a hand-hole 15 in a boiler 16. It will be noted that if the plate 10 were a disk having an unbroken perimeter, the introduction of the plate provided with the said cutter bars extending beyond the perimeter thereof, would be rendered difficult, if not impossible, and particularly if the diameter of said disk or plate equaled the diameter of the hole 15, as in the present design.

The pintle 9 is provided with a suitable perforation or passage, through which the bar 14 may be inserted. When the bar 14 is thus disposed, the plate 10 is moved to register the groove formed therein with the passage in the pintle. Thereafter, the bar 14 serves as a key for holding the plate 10 non-rotative upon the pintle 9 and body 8.

The short or half-length bars 21 and 22, when held in the grooves provided in the extensions 10, form leveling members for the tool when lifted against the inner seat to dress which the tool is provided. The bars 14, 21 and 22 are each provided with a blunt or other cutting edge 20, suitable for the work to be performed.

The bars 14 extend from the groove formed in the plate 10, and register with a corresponding groove formed in the plate 11. The plate 11 is preferably shaped to correspond with the plate 10. When the plate 11 is adjusted, the nut 13 is threaded upon the screw end 12 and manipulated to force the plate 11 into gripping relation with the bars 14.

The tool is now in position for operation. The end 17 of the body is provided with an end-opening socket suitably threaded or otherwise provided to engage power-transmission mechanism or the extension bit rod 18, which is adapted for mounting in a conventional brace, such as indicated by the broken lines 19 in the drawings. When the tool has been mounted on either the bit rod 18 or the power-driven mechanism, the mechanic, gripping the body portion 8, inclines the plates 10 and 11 and the bars 14, 21 and 22 therein to pass one or two of the lateral extensions of said plate through the hole 15 and in this manner to introduce said plates and tool entirely within the boiler 16. The tool is then partially withdrawn, the ends of the extension of the plate 10 neatly fitting the hole 15 to bear lightly against the edges thereof as the cutting bars are drawn against the gasket seat there provided. This work having been accomplished, the tool is withdrawn by reversing the operation above described.

It will be seen that as the hand holes vary in dimensions, the plates 10 and 11 vary to correspond, and that, as the seats for the gaskets vary in area, so the length of the bars 14 varies to correspond.

It is obvious that when the nut 13 is loosened, the bars 14, 14ª may be withdrawn from the engagement by the plates 10 and 11, and from the perforation in the pintle 9, to be replaced by tools of preferred shape and character.

Having thus described my invention, I claim as new and desire to secure by Letters Patent:—

1. A dresser for boiler cap seats, comprising a short body portion adapted for engagement with a rotary power tool, said body portion having a reduced screw-threaded end provided with a perforation to hold a cutter-bar; a plurality of clamping plates having lateral extensions with intervening recesses, said plates having grooves to hold said cutter-bar; and a nut to engage said screw-threaded end for moving said plates into juxtaposition.

2. A dresser for boiler cap seats, comprising a short body portion adapted for engagement with a rotary power tool, said body portion having a reduced screw-threaded end, provided with a perforation to hold a cutter bar; a plurality of clamping plates having lateral extensions with intervening recesses, said plates having grooves to hold said cutter bar, the ends of said extensions being curved concentric with said body portion and of a diameter equal to the hole surrounding which a seat is formed, said extensions operating as guide members for the dresser; and a nut to engage said screw-threaded end for moving said plates into juxtaposition.

In testimony whereof I have signed my name to this specification in the presence of two subscribing witnesses.

SIGURD DIESETH.

Witnesses:
THOMAS L. SLUGG,
JAMES McCANN.